US012559158B2

(12) United States Patent
Caverly et al.

(10) Patent No.: US 12,559,158 B2
(45) Date of Patent: Feb. 24, 2026

(54) SINGLE ACTUATOR TRANSLATING AND TELESCOPING STEERING COLUMN ASSEMBLY

(71) Applicant: Steering Solutions IP Holding Corporation, Saginaw, MI (US)

(72) Inventors: Jacob A. Caverly, Freeland, MI (US); Robert D. Maida, Pinconning, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 19/078,582

(22) Filed: Mar. 13, 2025

(65) Prior Publication Data

US 2025/0333095 A1     Oct. 30, 2025

Related U.S. Application Data

(60) Provisional application No. 63/640,308, filed on Apr. 30, 2024.

(51) Int. Cl.
B62D 1/185          (2006.01)
B62D 1/181          (2006.01)
(52) U.S. Cl.
CPC ............. B62D 1/185 (2013.01); B62D 1/181 (2013.01)

(58) Field of Classification Search
CPC ................................ B62D 1/185; B62D 1/181
See application file for complete search history.

(56) References Cited

U.S. PATENT DOCUMENTS

| | | | |
|---|---|---|---|
| 2015/0232117 A1* | 8/2015 | Stinebring ............. | B62D 1/181 |
| | | | 74/493 |
| 2019/0210633 A1* | 7/2019 | Derocher ............... | B62D 1/181 |
| 2023/0043788 A1* | 2/2023 | Ponikiewski .......... | B62D 1/181 |

* cited by examiner

*Primary Examiner* — Jason D Shanske
*Assistant Examiner* — Matthew James O'Neill
(74) *Attorney, Agent, or Firm* — Dickinson Wright PLLC

(57)          ABSTRACT

An axially adjustable steering column assembly includes an upper jacket. The steering column assembly also includes a lower jacket, wherein the upper jacket is received within the lower jacket and is telescopingly adjustable therein, wherein the lower jacket is translatable relative to a stationary component. The steering column assembly further includes a single motor controlling rotation of a leadscrew extending therefrom to actuate telescoping axial movement of the upper jacket and translation of the lower jacket. The steering column assembly yet further includes a first thread form region located at a distal portion of the leadscrew relative to the single motor. The steering column assembly also includes a second thread form region located at a proximal portion of the leadscrew relative to the single motor, wherein at least one feature of the first thread form region is different than the second thread form region.

16 Claims, 4 Drawing Sheets

SINGLE ACTUATOR TRANSLATING AND TELESCOPING STEERING COLUMN ASSEMBLY

CROSS-REFERENCE TO RELATED APPLICATION

This application claims the benefits of priority to U.S. Provisional Patent Application Ser. No. 63/640,308, filed Apr. 30, 2024, the disclosure of which is incorporated by reference herein in its entirety.

FIELD OF THE INVENTION

The embodiments described herein relate to vehicle steering systems and, more particularly, to a single actuator translating and telescoping steering column assembly.

BACKGROUND

Different vehicles typically include various steering system schemes, for example, steer-by-wire and driver interface steering. These steering system schemes typically include a steering column for translating steering input to an output that interacts with a steering linkage to ultimately cause the vehicle wheels (or other elements) to turn the vehicle.

Some steering columns are axially adjustable over a range of positions. In the past, a function of axially adjustable steering columns was to provide flexibility in the location of the hand wheel and facilitate more comfortable driving positions for different sizes of drivers. However, now there are opportunities for significantly more axial (i.e. telescopic and translating) travel, which also may be referred to as stow travel (i.e., when the hand wheel is not needed). For example, the hand wheel could be repositioned further away from the driver to allow more space for activities other than steering of the vehicle, such as work on a laptop computer when the vehicle is parked, for example. Other examples include vehicles with autonomous driving capability, such that the hand wheel could be stowed when the vehicle is in an autonomous driving mode.

Steering column assemblies that are moved significantly to a stowed position may be quite long. The significant length of a steering column presents packaging challenges that impose constraints on packaging a traditional internally stowing column (e.g., jacket-in-jacket or triple jacket).

In addition to the above-described challenges, some steering column assemblies are able to stow the handwheel over a long displacement range, but require multiple actuators to do so. In particular, one actuator may be utilized to generate telescope motion between the upper jacket and the lower jacket, while a second actuator is required to generate translational movement between the lower jacket and the column mounting bracket. Multiple actuators is costly and requires additional packaging space.

SUMMARY

According to one aspect of the disclosure, an axially adjustable steering column assembly includes an upper jacket. The steering column assembly also includes a lower jacket, wherein the upper jacket is received within the lower jacket and is telescopingly adjustable therein. The steering column assembly further includes a column mounting bracket, wherein the lower jacket is operatively coupled to the column mounting bracket and translates relative to the column mounting bracket. The steering column assembly yet further includes a single motor controlling rotation of a leadscrew extending therefrom. The steering column assembly also includes a first trunnion threaded to the leadscrew and operatively coupled to the upper jacket to control telescoping adjustment of the upper jacket relative to the lower jacket. The steering column assembly further includes a second trunnion threaded to the leadscrew and fixed to a component which is axially stationary relative to the upper jacket and the lower jacket, wherein the second trunnion controls translation movement of the lower jacket relative to the column mounting bracket.

According to another aspect of the disclosure, an axially adjustable steering column assembly includes an upper jacket. The steering column assembly also includes a lower jacket, wherein the upper jacket is received within the lower jacket and is telescopingly adjustable therein, wherein the lower jacket is translatable relative to a stationary component. The steering column assembly further includes a single motor controlling rotation of a leadscrew extending therefrom to actuate telescoping axial movement of the upper jacket and translation of the lower jacket. The steering column assembly yet further includes a first thread form region located at a distal portion of the leadscrew relative to the single motor. The steering column assembly also includes a second thread form region located at a proximal portion of the leadscrew relative to the single motor, wherein at least one feature of the first thread form region is different than the second thread form region.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
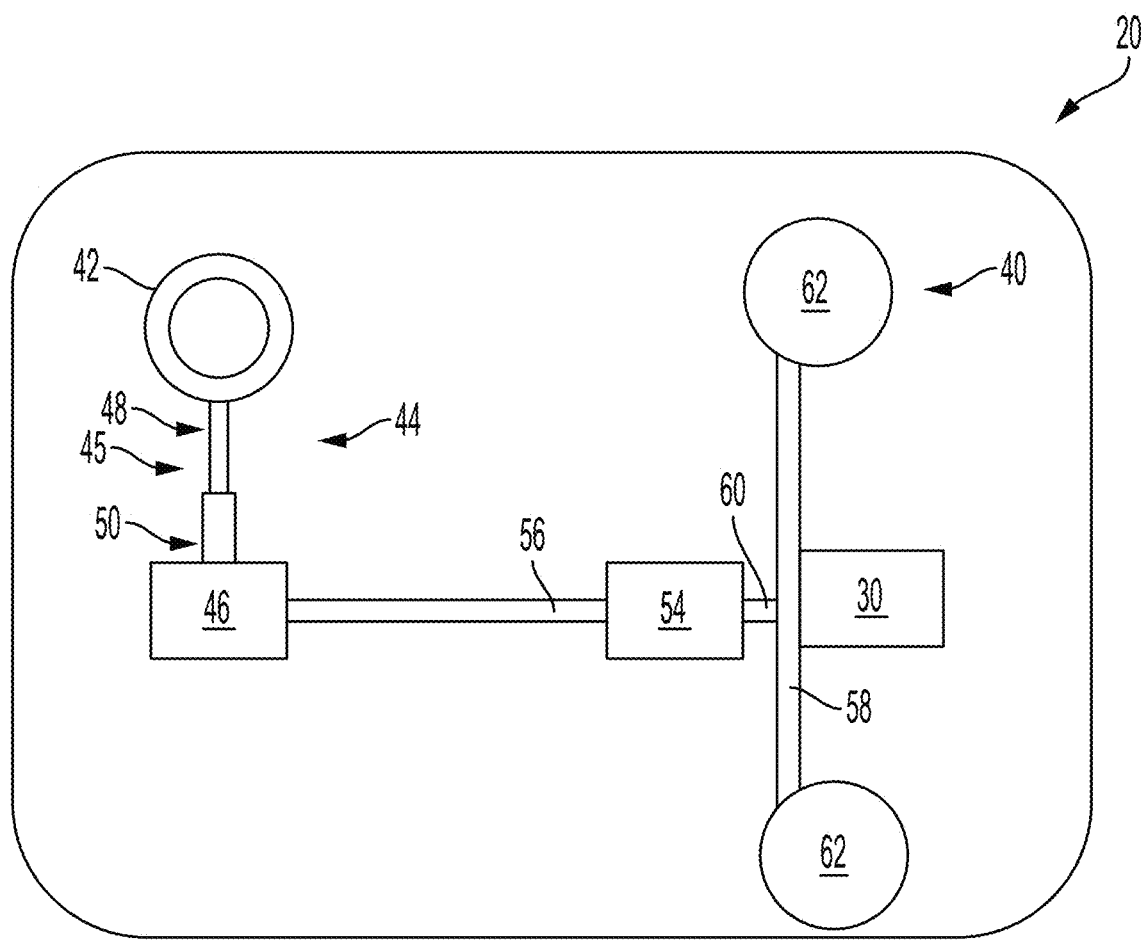
FIG. 1 schematically illustrates a vehicle steering system.

The following discussion is directed to various embodiments of the disclosure. Although one or more of these embodiments may be described in more detail than others, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable vehicles, include various steering system schemes, for example, autonomous or semi-autonomous steering modes, steer-by-wire systems and driver interface steering. These steering system schemes typically include a steering column for translating steering input to an output that interacts with a steering linkage to ultimately cause the vehicle wheels (or other elements) to turn the vehicle. Some steering columns are axially adjustable over a range of axial positions. In the past, a function of axially adjustable steering columns was to provide flexibility in the location of the hand wheel and facilitate more comfortable driving positions for different sizes of drivers. However, now there are opportunities for significantly more telescopic travel, which also may be referred to as stow travel (i.e., when the hand wheel is not needed). For example, the hand wheel could be repositioned completely away from the driver to allow him or her to do things other than operate the vehicle when the vehicle is parked or during autonomous vehicle operation. Therefore, the steering column assembly described herein is axially moveable between a range of axial positions that include extended positions that make the steering input device (e.g., steering wheel) graspable for use and a stowed position which places the steering input device in close proximity to or at least partially within a dashboard or instrument cluster structure.

Referring now to the drawings, where the various embodiments are shown and described herein without limiting same, FIGS. 1-4 illustrate embodiments of a steering column assembly that is axially adjustable with improved packaging and other operational benefits. The axial adjustability results from relative movement between steering column portions (e.g. jackets, brackets, rails, and/or the like) which permit axial movement therebetween. In the disclosure, the term "jacket" is used to represent any form of column portions. In particular, an upper jacket and a lower jacket will be referenced and is illustrated in the drawings. The specific terminology is not limiting of the particular type of steering column portions contemplated within the scope of the disclosure.

In some embodiments, the relative movement between the column portions work in combination with relative movement between multiple steering shaft portions that permit axial movement therebetween. Axial movement refers to movement resulting from relative telescopic, sliding, and/or translational movement between components in a longitudinal direction of the overall steering column assembly.

Referring initially to FIG. 1, a vehicle 20 is generally illustrated according to the principles of the present disclosure. The vehicle 20 may include any suitable vehicle, such as a car, a truck, a sport utility vehicle, a mini-van, a crossover, any other passenger vehicle, any suitable commercial vehicle, or any other suitable vehicle. While the vehicle 20 may be a passenger vehicle having wheels and for use on roads, the principles of the present disclosure may apply to other vehicles, such as planes, tractors, boats, or other suitable vehicles. The vehicle 20 may include a propulsion system 30, such as an internal combustion system, an electric system, or combinations thereof.

The vehicle 20 includes a steering system 40. The steering system 40 may be configured as a driver interface steering system, an autonomous driving system, or a system that allows for both driver interface and autonomous steering. The steering system may include a steering input device 42, such as a steering wheel, wherein a driver may manually provide a steering input by turning the steering wheel. A steering column assembly 44 includes a steering column 45 that extends along an axis from the steering input device 42 to an output assembly 46. The output assembly 46 is part of a steer-by-wire and/or autonomous driving system. The output assembly 46 may be referred to as an emulator or hand wheel actuator in steer-by-wire embodiments and is used to provide feedback to the steering input device 42 and to receive manual driver inputs for steering control.

Figure 2:
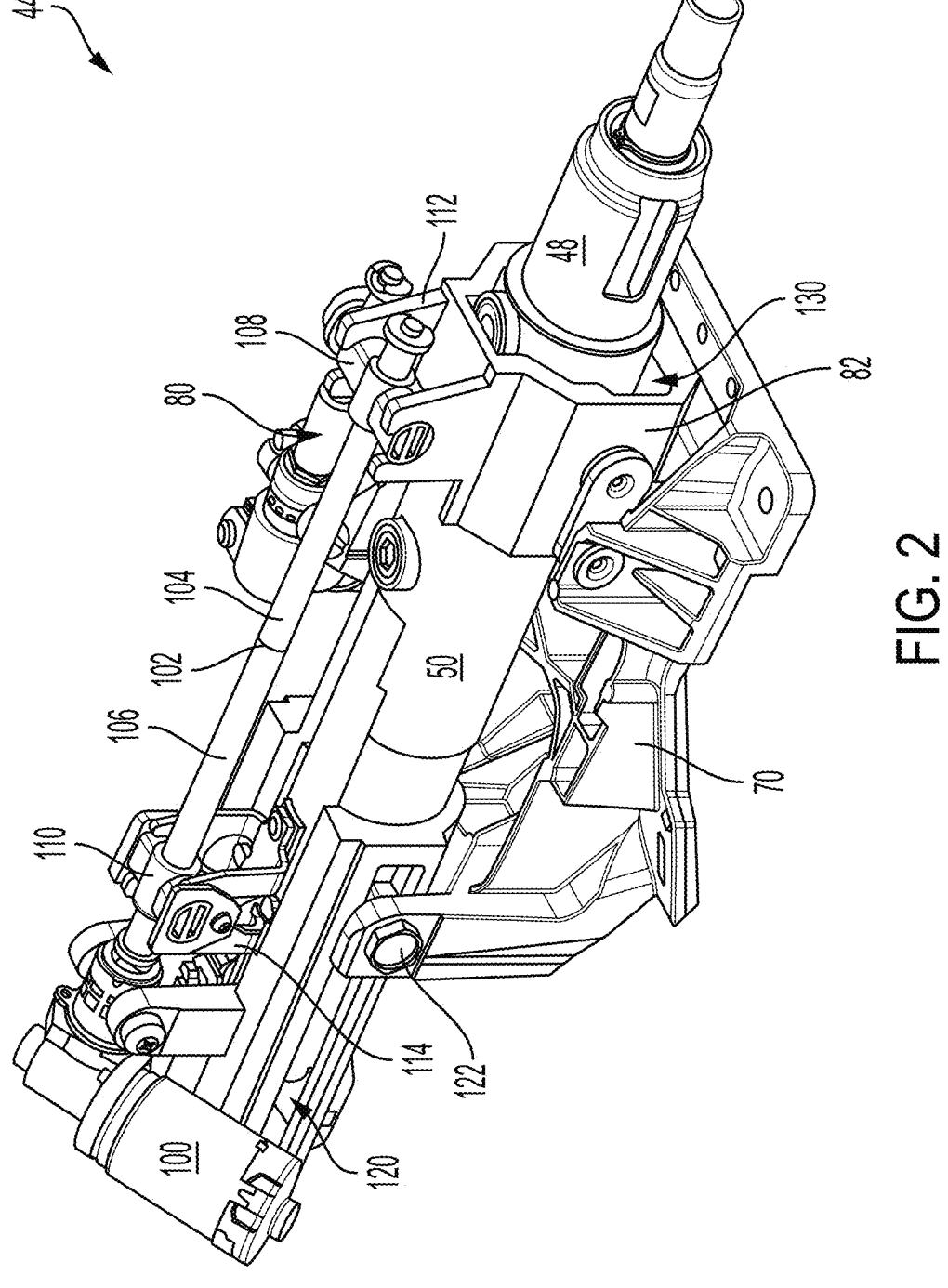
FIG. 2 is a perspective view of a steering column assembly for the vehicle steering system in a first axial position.

The steering column 45 includes two axially adjustable portions, for example, an upper jacket 48 and a lower jacket 50 that are axially adjustable with respect to one another. The steering column 45 is moveable over a range of positions from a fully extended position (FIG. 4) to a fully retracted position (FIG. 2). In the fully extended position, the steering input device 42 is axially position to be located near an operator of the vehicle. In the retracted position, the steering input device 42 is axially positioned to be located further away from an operator of the vehicle, when compared to the extended position. In some embodiments, the retracted position may correspond to stowing the input device 42. For example, it may be beneficial to place the input device 42 in a stowed location during autonomous driving. In operation, axial movement of the steering column assembly 44 is effectuated electromechanically by a single actuator, as disclosed herein. This axial movement adjusts between the extended position, the retracted position, and any intermediate positions (FIG. 3).

A steering gear assembly 54 may connect to the output assembly 46 via a steering gear input shaft 56. The steering gear assembly 54 may be configured as a rack-and-pinion, a recirculating ball-type steering gear, or any other types of steering gears associated with autonomous and driver-interface steering systems. The steering gear assembly 54 may then connect to a driving axle 58 via an output shaft 60. The output shaft 60 may include a pitman arm and sector gear and/or various traditional components. The output shaft 60 is operably connected to the steering gear assembly 54 such that a rotation of the steering gear input shaft 56 causes a responsive movement of the output shaft 60 and causes the drive axle to turn road wheels 62.

Figure 3:
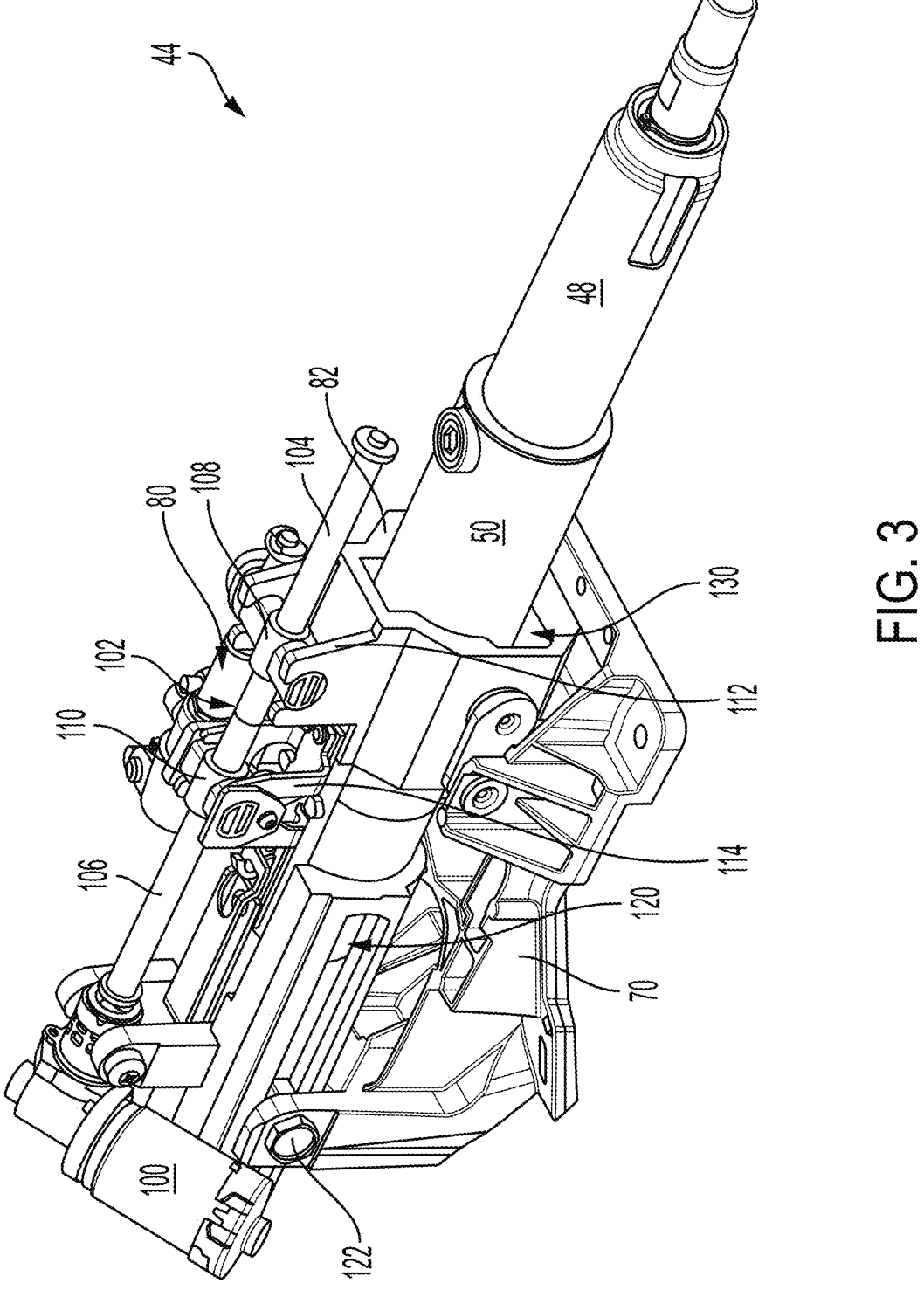
FIG. 3 is a perspective view of the steering column assembly in a second axial position.
Figure 4:
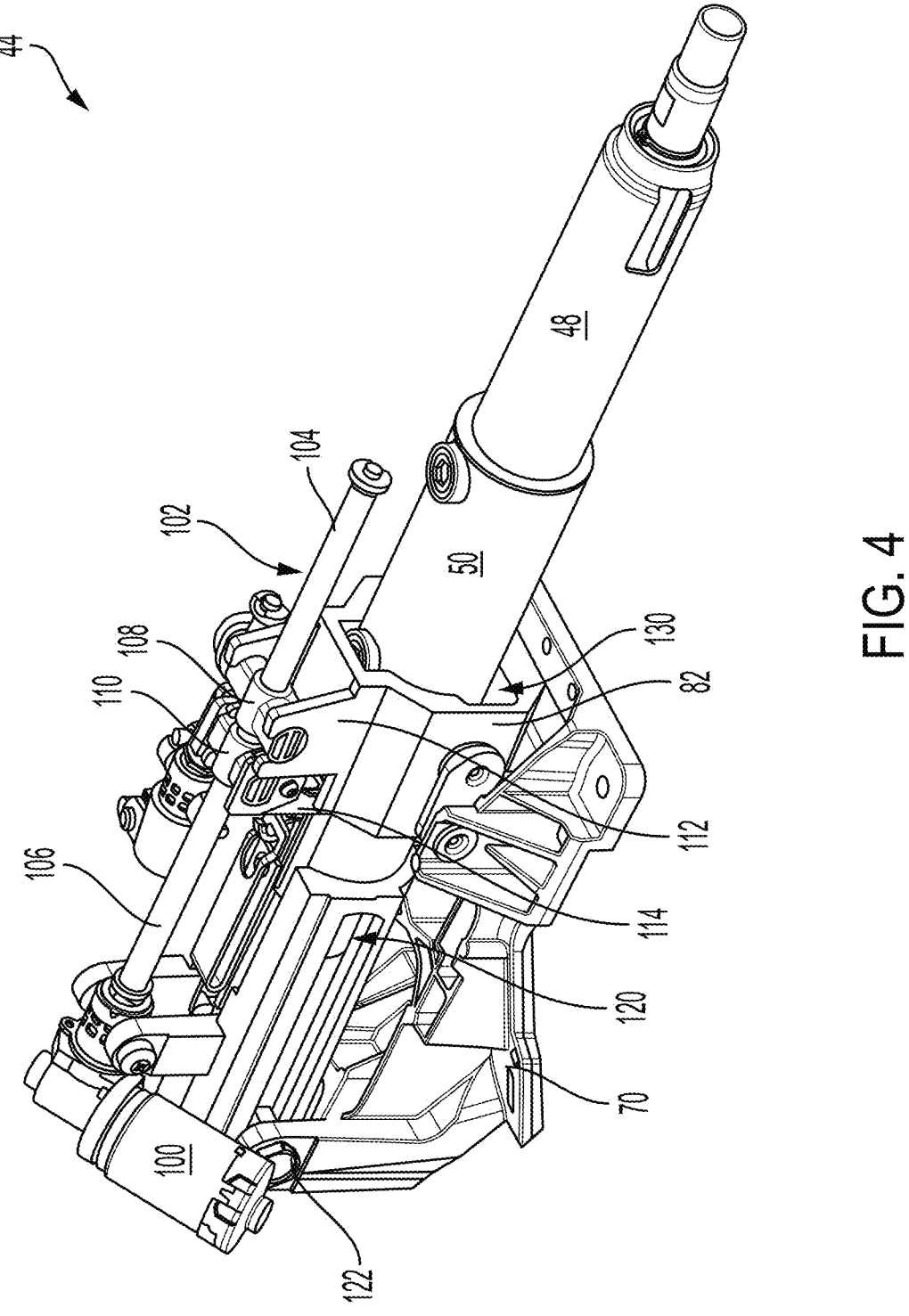
FIG. 4 is a perspective view of the steering column assembly in a third axial position.

With reference now to FIGS. 2-4, the steering column assembly 44 is illustrated in greater detail. The upper jacket 48 is shown protruding from the lower jacket 50 and is moveable relative to the lower jacket 50 via telescoping axial motion. The lower jacket 50 is operatively coupled to, and axially translatable relative to, a column mounting bracket 70. The column mounting bracket 70 is fixed relative to a vehicle structure (not shown) to mount the steering column assembly 44 to the vehicle.

Overall axial movement of the steering column 45 includes telescoping movement of the upper jacket 48 relative to the lower jacket 50 and translation of the lower jacket 50 relative to the column mounting bracket 70. The overall axial adjustability encompasses two distinct ranges of axial position for the steering column 45, and the steering input device 42. The first range of axial positions may be referred to as a "comfort range". The comfort range is a range of axial positions that are useful and practical for manual driving during operation of the vehicle for different sized operators. In other words, the steering input device 42 is accessible and able to be comfortably controlled over the first range of axial positions. The second range of axial positions may be referred to as a "stowing range" of the steering column 45. The stowing range is a range of axial positions that moves the overall steering column assembly further away from the operator when compared to the comfort range (i.e., toward an instrument panel and firewall of the vehicle). In some embodiments, the fully retracted position is a stowed position that may be flush with an instrument panel, firewall or other vehicle structure. The stowing range of axial movement includes further telescope travel of the upper jacket 48 relative to the lower jacket 50, in combination with axial movement of the lower jacket 50 relative to the column mounting bracket 70. The movement of the lower jacket 50 relative to the column mounting bracket 70 is done in a translating manner due to the movement of the overall upper and lower jackets together adjacent to the column mounting bracket 70.

FIGS. 2-4 illustrate the steering column assembly 44 in various axial positions. In particular, FIG. 2 shows the steering column assembly 44 in a stowed position where the upper jacket 48 is positioned in a full telescope-in location relative to the lower jacket 50, and the lower jacket 50 is translated fully away from the operator relative to the column mounting bracket 70. FIG. 3 shows the steering column assembly 44 in an intermediate axial position between the fully stowed position (i.e. retracted away from driver) and a fully extended position (i.e., closest to driver). FIG. 4 shows the steering column assembly 44 in a fully extended axial position.

With continued reference to FIGS. 2-4, the steering column assembly 44 includes a single axial adjustment actuator 100. While other types of actuators may be utilized, such as a rake actuator 80, an emulator, and/or a hand wheel actuator, it is to be understood that the steering column assembly 44 includes only the single axial adjustment actuator 100. Therefore, the single axial adjustment actuator 100 is the only actuator that is dedicated to solely adjusting the axial position of the steering column 45. In the illustrated embodiment, the actuator 100 is mounted to a forward portion of the lower jacket 45, but other mounting locations are contemplated. The directional term "forward" in this disclosure is defined by forward in a vehicle and away from a location where the steering input device 42 is mounted to the steering column 45, whereas "rear" is defined by rearward in a vehicle and closer to the location where steering input device 42 is mounted to the steering column 45.

The rake actuator assembly 80 controls movement in a rake direction of the steering column assembly 44 to adjust the steering column 45 substantially vertically about a pivot axis. The rake actuator assembly 80 includes a rake support bracket 82 which is operatively coupled to the column mounting bracket 70. As such, the rake support bracket 82 remains substantially stationary in an axial direction relative to the upper jacket 48 and the lower jacket 50. As shown, the rearward end of the lower jacket 50 extends through an opening 130 of the rake support bracket 82.

The above-described axial motions, namely telescoping and translation, are actuated simultaneously due to the single actuator 100 providing rotation to a single leadscrew 102. The leadscrew 102 includes two thread form regions on an outer surface thereof. A first thread form region 104 may be a left-hand thread distal to the actuator 100, and a second thread form region 106, which is a right-hand thread, proximal to the actuator 100. It should be noted that the positions of the above-defined thread form regions 104, 106 on the leadscrew 102 could be switched in other embodiments and still function with the actuator motor rotation direction and compatible thread form on the trunnions (described below) dictating which thread forms provide the desired operation.

The axial actuator assembly includes a first trunnion 108 and a second trunnion 110. Each trunnion is threadably coupled to the leadscrew 102, each with an internal thread corresponding to the respective leadscrew thread form, as discussed above. The first trunnion 108 is attached to the rake support bracket 82. In the illustrated embodiment, the first trunnion 108 is seated within a pair of arms 112 on each side of the rake support bracket 82. This attachment ensures that the first trunnion 108 remains stationary during rotation of the leadscrew 102. The rake support bracket 82 provides the reaction and grounding point for the axial motion of the steering column 45 since the rake support bracket 82 is substantially axially stationary relative to the upper jacket 48 and the lower jacket 50.

The second trunnion 110 is operatively coupled to the upper jacket 48. Coupling between the second trunnion 110 and the upper jacket 48 may be made in any suitable manner. In the illustrated embodiment, the second trunnion 110 is fixed to a trunnion bracket 114 that is directly or indirectly coupled to the upper jacket 48. An example of an indirect coupling between the trunnion bracket 114 and the upper jacket 48 is with an energy absorption strap or other device being disposed between the upper jacket 48 and the trunnion bracket 114. The connection between the components coupling the second trunnion 110 and the upper jacket 48 are made through a cutout region of the lower jacket 50 to provide access for a coupling location of the upper jacket 48. Regardless of the precise connection between the second trunnion 110 and the upper jacket 48, a mechanical connection is made between the second trunnion 110 and the upper jacket 48 which ensures that corresponding axial motion is made between the components. In particular, movement of the second trunnion 110 along the leadscrew 102, specifically along the second thread form region 106 of the leadscrew 102, results in axial movement of the upper jacket 48 in a telescoping manner within the lower jacket 50.

The actuator 100 is operatively coupled to the lower jacket 50. Upon rotation of the actuator leadscrew 102, the actuator assembly, which includes the actuator 100, the leadscrew 102 and the trunnions 108, 110, is pulled and pushed relative to the rake support bracket 82 to generate the translation portion of the axial movement of the steering column 45 since the actuator 100 is secured to the lower jacket 50. The translation of the lower jacket 50—and therefore the upper jacket 48 as well—is facilitated by movement of the lower jacket 50 relative to the column mounting bracket 70. In the illustrated embodiment, the lower jacket 50 includes at least one guide slot 120 extending in an axial direction of the steering column 45. A mechanical fastener 122, such as a bolt, pin or the like, extends through an arm of the column mounting bracket 70 and into the guide slot 120 of the lower jacket 50. It is to be appreciated that a second guide slot and mechanical fastener are duplicated on the other side of the steering column 45 in some embodiments. Therefore, as the leadscrew 102 axially translates due to rotation within the stationary, first trunnion 108, the entire lower jacket 50 moves axially relative to the column mounting bracket 70. The movement is permitted due to the guide slot(s) 120 being able to move along the mechanical fastener(s) 122. The leadscrew 102 is operatively coupled to the lower jacket 50 to axially drive the lower jacket 50 during axial translation of the leadscrew 102.

In some embodiments, the translation portion of the axial adjustment contributes to approximately half of the overall axial displacement over the axial range of motion, however more or less of the overall axial displacement may be attributed to the translation. The other portion of the axial displacement is achieved by the second trunnion 110, which is operatively coupled to the upper jacket 48. During leadscrew 102 rotation, the upper jacket 48 is telescoped in and out of the lower jacket 48 due to the connection between the trunnion and the upper jacket 48.

The embodiments disclosed herein provide a stowable steering column assembly 44 that only requires a single axial actuator. This reduces cost, weight and operational complexity of the system.

While the invention has been described in detail in connection with only a limited number of embodiments, it is to be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Moreover, any feature, element, component or advantage of any one embodiment can be used on any of the other embodiments. Accordingly, the invention is not to be seen as limited by the foregoing description.

What is claimed is:

1. An axially adjustable steering column assembly comprising:
   an upper jacket;
   a lower jacket, wherein the upper jacket is received within the lower jacket and is telescopingly adjustable therein;
   a column mounting bracket, wherein the lower jacket is operatively coupled to the column mounting bracket and translates relative to the column mounting bracket;
   a single motor controlling rotation of a leadscrew extending therefrom;
   a first trunnion threaded to the leadscrew and operatively coupled to the upper jacket to control telescoping adjustment of the upper jacket relative to the lower jacket; and
   a second trunnion threaded to the leadscrew and fixed to a component which is axially stationary relative to the upper jacket and the lower jacket, wherein the second trunnion controls translation movement of the lower jacket relative to the column mounting bracket, wherein the lower jacket defines at least one slot extending axially along the lower jacket, wherein a mechanical fastener extends through an arm of the column mounting bracket and into the slot.

2. The axially adjustable steering column assembly of claim 1, wherein the leadscrew comprises:
   a first thread form region located at a distal portion of the leadscrew relative to the single motor; and
   a second thread form region located at a proximal portion of the leadscrew relative to the single motor, wherein at least one feature of the first thread form region is different than the second thread form region.

3. The axially adjustable steering column assembly of claim 2, wherein the first thread form region is a left-hand thread form and the second thread form region is a right-hand thread form.

4. The axially adjustable steering column assembly of claim 2, wherein the first thread form region is a right-hand thread form and the second thread form region is a left-hand thread form.

5. The axially adjustable steering column assembly of claim 2, wherein the first trunnion has a first inner thread matching the first thread form region and in contact therewith, wherein the second trunnion has a second inner thread matching the second thread form region and in contact therewith.

6. The axially adjustable steering column assembly of claim 1, wherein the component which is axially stationary relative to the upper jacket and the lower jacket is a rake bracket.

7. The axially adjustable steering column assembly of claim 6, wherein the upper jacket and the lower jacket extend through an opening of the rake bracket.

8. The axially adjustable steering column of claim 6, wherein the first trunnion is seated within a pair of arms on each side of the rake support bracket to maintain an axially stationary position of the first trunnion relative to the leadscrew.

9. An axially adjustable steering column assembly comprising:
   an upper jacket;
   a lower jacket, wherein the upper jacket is received within the lower jacket and is telescopingly adjustable therein, wherein the lower jacket is translatable relative to a stationary component;
   a single motor controlling rotation of a leadscrew extending therefrom to actuate telescoping axial movement of the upper jacket and translation of the lower jacket;
   a first thread form region located at a distal portion of the leadscrew relative to the single motor; and
   a second thread form region located at a proximal portion of the leadscrew relative to the single motor, wherein at least one feature of the first thread form region is different than the second thread form region, wherein the lower jacket defines at least one slot extending axially along the lower jacket, wherein a mechanical fastener extends through an arm of the column mounting bracket and into the slot.

10. The axially adjustable steering column assembly of claim 9, further comprising:
   a column mounting bracket, wherein the lower jacket is operatively coupled to the column mounting bracket and translates relative to the column mounting bracket;
   a first trunnion threaded to the leadscrew and operatively coupled to the upper jacket to control telescoping adjustment of the upper jacket relative to the lower jacket; and
   a second trunnion threaded to the leadscrew and fixed to a component which is axially stationary relative to the upper jacket and the lower jacket, wherein the second trunnion controls translation movement of the lower jacket relative to the column mounting bracket.

11. The axially adjustable steering column assembly of claim 9, wherein the first thread form region is a left-hand thread form and the second thread form region is a right-hand thread form.

12. The axially adjustable steering column assembly of claim 11, wherein the first thread form region is a right-hand thread form and the second thread form region is a left-hand thread form.

13. The axially adjustable steering column assembly of claim 11, wherein the first trunnion has a first inner thread matching the first thread form region and in contact therewith, wherein the second trunnion has a second inner thread matching the second thread form region and in contact therewith.

14. The axially adjustable steering column assembly of claim 10, wherein the component which is axially stationary relative to the upper jacket and the lower jacket is a rake bracket.

15. The axially adjustable steering column assembly of claim 14, wherein the upper jacket and the lower jacket extend through an opening of the rake bracket.

16. The axially adjustable steering column of claim 14, wherein the first trunnion is seated within a pair of arms on each side of the rake support bracket to maintain an axially stationary position of the first trunnion relative to the lead-screw.

* * * * *